Feb. 3, 1970 M. S. ZIMMERMAN 3,493,876

STABLE COHERENT FILTER FOR SAMPLED BANDPASS SIGNALS

Filed June 28, 1966

INVENTOR,
MARK S. ZIMMERMAN
BY: Harry M. Saragovitz,
Edward J. Kelly, Herbert Berl &
Julian C. Keppler
ATTORNEYS.

United States Patent Office 3,493,876

Patented Feb. 3, 1970

3,493,876

STABLE COHERENT FILTER FOR SAMPLED BANDPASS SIGNALS

Mark S. Zimmerman, Bala-Cynwyd, Pa., assignor to the United States of America as represented by the Secretary of the Army Filed June 28, 1966, Ser. No. 562,433
Int. Cl. H03b 1/04, 3/04
U.S. Cl. 328—167 4 Claims

ABSTRACT OF THE DISCLOSURE

A two-channel bandpass, filter network encompassing a quadrature rejection system. An input signal comprising a carrier frequency and a sampled frequency is applied simultaneously to multipliers in each of the two channels and a local oscillator provides to both multipliers a reference carrier signal at the same frequency of the input carrier. The reference carrier is applied directly to one of the multipliers but is shifted 90° before application to the second multiplier. The output of the second multiplier is then shifted another 90° to provide phase quadrature signals in the two channels. The quadrature signals may then be summed and bandpass filtered or filtered and then summed to provide a true output signal at the sampled frequency.

Figure 1:
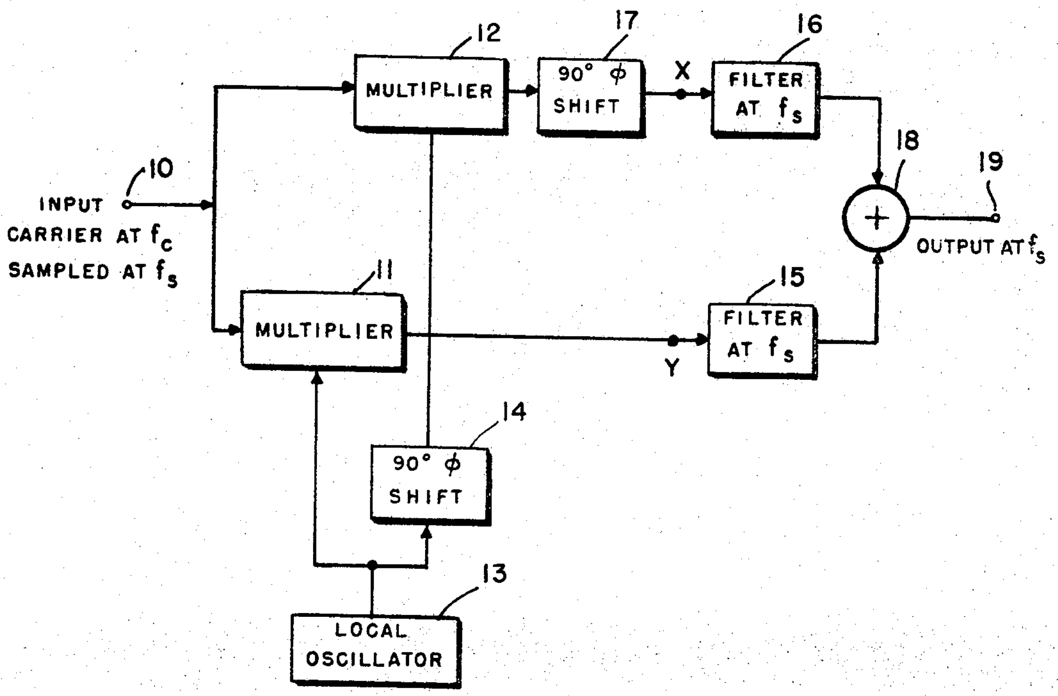

This invention relates to a filter system which provides narrow band filtering of high frequency signals without resorting to extremely high Q filters. More particularly it relates to narrow band filtering of sampled bandpass signals such as those which exist in numerous types of pulse communication systems including time division multiplex receivers.

Of the many diverse types of filters which exist in the prior art, the passive type is probably the most numerous. For many filter applications, this type is the most practical, since it is simple and inexpensive. However, in high frequency filtering applications where sharp discrimination against unwanted frequencies is desired, passive networks are ineffective. Even active filter arrangements which use crystals and negative feedback to increase selectivity fail to meet the selectivity requirements of some filter applications.

A heterodyning filter which demodulates a high frequency signal to baseband (center frequency is zero) was developed for use in situations requiring filtering operations which are active. For a given bandwidth the required Q is proportional to the frequency of operation. Since the heterodyning filter performs the filtering operation at a much lower frequency than the input signal frequency, the Q of the filter used is easily realizable and the effective Q of the overall filter network can be relatively high. The main problem encountered with this form of heterodyning filter is that it is susceptible to DC drifts and offsets in the active elements of the filter.

Where active filtering operations are required, such as in integrate and dump filters, the improved filter of this invention is superior to the form of heterodyning filter which demodulates to baseband and then performs the filtering function with a low pass filter. The improved filtering action is made possible by utilizing the inherent frequency spectrum of a sampled or pulsed input signal. This method is therefore particularly useful for filtering sampled bandpass signals such as those which appear in a time multiplex receiver or at the output of a chopper.

The signal appearing at the input of the filter is a pulsed high frequency carrier which contains both amplitude and phase information. For the purposes of this discussion the carrier frequency of the input signal is designated as $f_c$ and the sampling rate is $f_s$. The frequency of the carrier is translated from $f_c$ to baseband in a heterodyne circuit.

After this translation the signal (due to the fact that it is sampled) has similar components centered at zero c.p.s. and at multiples of the sampling frequency. Each of these components is a band of signals the width of which is equal in frequency to the sampling rate. Therefore, the output of the frequency translator is a plurality of bands of signals centered at zero c.p.s., $f_c$, $2f_c$ etc., and the width of each of these bands is $f_c$ cycles. The desired filtering is performed by a bandpass filter which is centered at the sampling frequency $f_s$ and has a bandwidth substantially equal to $f_s$.

An object of this invention is to provide conveniently realizable embodiments of symmetrical bandpass filters, particularly those filters which would require extremely high Q elements.

Another object of this invention is to provide a filter having improved stability and ease of realization of high Q filtering operations compared with systems which perform the filtering operation at higher carrier frequencies.

A further object of this invention is to provide narrow band filtering of high frequency signals without resorting to unreasonably high Q filters.

Another object of this invention is to provide a symmetrical bandpass filter in which the filtering function is performed at a frequency lower than the input signal frequency, and yet is immuned to the DC drifts and offsets which are encountered when using heterodyning filters which use a low pass filter.

Figure 2:
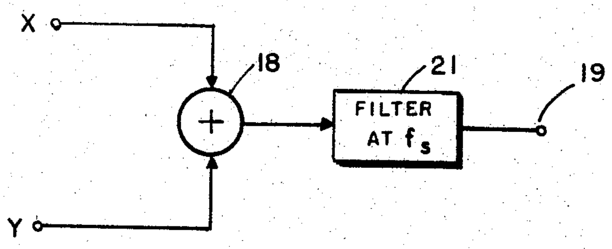

These and other objects and advantages of this invention will become more readily apparent from the following specification taken in conjunction with the accompanying drawings in which:

FIG. 1 is a block diagram of one form of the filter system of this invention, and FIG. 2 is a block diagram of a simplified alternative of the invention which is to be connected to points $x$ and $y$ of FIG. 1 and replace the components to the right of these points.

Referring now to the drawings, in FIG. 1 there is illustrated a filter system having an input terminal 10 to which a source may be connected to provide a signal having a center carrier frequency $f_c$, said signal being sampled at a rate $f_s$. These complex valued samples, i.e., samples which contain both amplitude and phase information, are connected to one of the input terminals of each of the two multipliers or mixers 11 and 12. The second input to the multiplier 11 is supplied by a local oscillator 13 which is a continuous wave reference carrier operating at a frequency $f_r$, which is the center frequency of the input signal spectrum. The reference input to the multiplier 12 is derived from the oscillator 13 but is phase shifted 90° by a phase shifter 14. The spectra of the outputs of the two multipliers are identical and contain frequency components centered around zero and integral multiples of $f_s$ as stated above. These multiplier output signals are samples occurring at a rate $f_s$, the amplitudes thereof representing the projections of the input signal vector on the two quadrature axes determined by the quadrature components of the reference carrier $f_r$. The output of the multiplier 11 is connected directly to a filter 15 while the output of the multiplier 12 is connected to a filter 16 by a 90° phase shifter 17. The desired filtering is performed on the outputs of the two quadrature channels by the filters 15 and 16 which are identical bandpass filters centered at the frequency $f_s$. The outputs from the filters 15 and 16 are connected to an adder 18 from which the output signal, which appears at terminal 19, is taken.

The use of filters centered at $f_s$ rather than low pass filters allows more stable filtering to be achieved, especially in the case of active filters. Taking the output of the filters at $f_s$ also simplifies considerably any further single sideband frequency translations.

The additional 90° phase shift provided in the quadrature channel by the phase shifter 17 provides a bandpass signal which is truly in quadrature with the other channel at the adder 18 and provides at the output terminal 19 a signal which has been filtered and effectively single sideband frequency translated from $f_c$ to $f_s$. Since the filtering in the quadrature channel is narrow band around $f_s$ the phase shifter 17 can be a narrow band device or can simply be a delay line following the multiplier 12. The delay of this line would be that which provides 90° of phase shift at $f_s$.

A simplification of this filter appearing in FIG. 2 results in improved reliability. This modification replaces the components to the right of points $x$ and $y$ in FIG. 1. The filters 15 and 16 are replaced by a single filter 21 which is connected to the output of the adder 18. The output terminal 19 is therefore connected to the output of the filter 21. This modification is functionally equivalent to the circuit shown in FIG. 1, but it permits the filtering to be achieved in a single filter thereby avoiding possible matching problems between the two filters 15 and 16.

The above disclosed example is merely for the purpose of describing this invention. With a sampled input signal other than the complex one described hereinabove, simpler frequency translating circuitry can be used. However, due to the complex nature of the input signal and the rate at which it is sampled, the disclosed quadrature channel single sideband translating system is necessary. If the input signal contained only amplitude information, then a conventional single channel frequency translating circuit could be used. However, where the input signal contains phase as well as amplitude information, a conventional frequency translating circuit followed by a filter centered at $f_s$ could not be used since it would not retain the phase information. When the sampled complex signal is translated in quadrature channels, the outputs from the two channels thereafter being added, the phase information of the input signal is retained.

What is claimed is:

1. A sharp cutoff high frequency filter for sampled bandpass signals comprising: input terminal means for providing a source of sampled bandpass signals having an average carrier frequency $f_c$ and a sampling rate $f_s$, means to translate the frequency of said input signals from the carrier frequency $f_c$ to baseband and filter means connected to said frequency translating means for passing only a band of signals which is centered around the frequency $f_s$.

2. A filter as set forth in claim 1 wherein said frequency translating means comprises a reference oscillator for generating a reference signal at a frequency $f_c$ and means for mixing said reference signal and said input signal.

3. A filter as set forth in claim 1 wherein said frequency translating means comprises a reference oscillator for generating a reference signal at said carrier frequency $f_c$, first and second multipliers connected to said input signal terminal, said reference oscillator being directly connected to said first multiplier, a first ninety degree phase shifter connecting said reference oscillator to said second multiplier, an adding circuit having first and second input terminals and an output terminal, and a second ninety degree phase shifter connected to the output of said second multiplier, and said filter means comprises first and second filters, said first filter being interposed between said second phase shifter and said first adding circuit input terminal, and said second filter being connected between the output of said first multiplier and said second adding circuit input terminal.

4. A filter as set forth in claim 1 wherein said frequency translating means comprises a reference oscillator for generating a reference signal at said carrier frequency $f_c$, first and second multipliers connected to said input signal terminal, said reference oscillator being directly connected to said first multiplier, a first ninety degree phase shifter connecting said reference oscillator to said second multiplier, a second ninety degree phase shifter connected to the output of said second multiplier, an adding circuit having first and second input terminals and an output terminal, said first adding circuit input terminal being connected to the output of said first multiplier and said second adding circuit input terminal being connected to said second phase shifter, said filter means being connected to said adding circuit output terminal.

References Cited

UNITED STATES PATENTS

| | | | | |
|---|---|---|---|---|
| 2,961,533 | 11/1960 | Martin | 325—419 | X |
| 2,979,662 | 4/1961 | Farrow | 328—167 | X |
| 3,035,231 | 5/1962 | Neelands et al. | 328—141 | X |
| 3,060,380 | 10/1962 | Howells et al. | 329—50 | X |
| 3,229,231 | 1/1966 | Saraga | 329—50 | X |

JOHN S. HEYMAN, Primary Examiner

R. C. WOODBRIDGE, Assistant Examiner

U.S. Cl. X.R.

325—419; 328—141; 329—50